(12) United States Patent
Siu (10) Patent No.: US 9,708,099 B2
(45) Date of Patent: Jul. 18, 2017

(54) CHECK VALVE AND FLUID CONTAINER COMPRISING THE SAME

(71) Applicant: Sam Siu Wai Siu, Hongkong (CN)

(72) Inventor: Sam Siu Wai Siu, Hongkong (CN)

( * ) Notice: Subject to any disclaimer, the term of this patent is extended or adjusted under 35 U.S.C. 154(b) by 791 days.

(21) Appl. No.: 14/165,616

(22) Filed: Jan. 28, 2014

(65) Prior Publication Data

US 2014/0138342 A1 May 22, 2014

Related U.S. Application Data (63) Continuation-in-part of application No. PCT/CN2012/079520, filed on Aug. 1, 2012.

(30) Foreign Application Priority Data

Aug. 2, 2011 (CN) .......................... 2011 1 0220309

(51) Int. Cl.
| | | |
|---|---|---|
| *B65D 23/00* | (2006.01) | |
| *B65D 51/16* | (2006.01) | |
| *B65D 77/22* | (2006.01) | |
| *F16K 24/06* | (2006.01) | |
| *F16K 15/14* | (2006.01) | |

(52) U.S. Cl.
CPC ......... *B65D 23/00* (2013.01); *B65D 51/1644* (2013.01); *B65D 77/225* (2013.01); *F16K 15/14* (2013.01); *F16K 24/06* (2013.01); *Y10T 137/7043* (2015.04)

(58) Field of Classification Search
USPC ................................................ 137/517, 519
See application file for complete search history.

(56) References Cited

U.S. PATENT DOCUMENTS

| | | | | |
|---|---|---|---|---|
| 1,808,702 A | * | 6/1931 | Williams ........... | B65D 51/1644 215/260 |
| 2,214,346 A | * | 9/1940 | Pim .......................... | F16K 1/36 137/517 |
| 2,674,262 A | * | 4/1954 | Bradshaw ............... | F16K 17/30 137/517 |
| 3,910,461 A | * | 10/1975 | Eager ..................... | B65D 11/16 220/592.19 |
| 4,624,286 A | * | 11/1986 | Frohn ................ | B65D 51/1644 137/197 |
| 4,712,583 A | * | 12/1987 | Pelmulder ............. | A61M 39/24 137/494 |
| 4,877,624 A | * | 10/1989 | Floyd ........................ | A23L 3/10 137/522 |
| 5,241,984 A | * | 9/1993 | Onjohji ................... | F16K 17/28 137/460 |

(Continued)

*Primary Examiner* — Jessica Cahill
*Assistant Examiner* — Daphne M Barry
(74) *Attorney, Agent, or Firm* — Matthias Scholl, PC; Matthias Scholl (57) ABSTRACT

A check valve including a silica gel valve body, an upper valve cover, and a lower valve cover. The upper valve cover is provided with an air hole, and the lower valve cover is provided with an air inlet leg. The silica gel valve body includes an outer ring and an inner ring, a sealed valve plate is arranged inside the inner ring, and the outer ring is connected to the inner ring through elastic pieces. The outer ring is fixed between the upper valve cover and the lower valve cover. The inner ring is in a suspended state between the upper valve cover and the lower valve cover.

10 Claims, 6 Drawing Sheets

(56) References Cited

U.S. PATENT DOCUMENTS

| | | | | |
|---|---|---|---|---|
| 5,349,179 A | * | 9/1994 | Morley | G02B 23/10 |
| | | | | 250/214 VT |
| 6,945,277 B2 | * | 9/2005 | Schmalz | F16K 15/144 |
| | | | | 137/510 |
| 7,370,645 B2 | * | 5/2008 | Freeman | F01M 13/0011 |
| | | | | 123/574 |
| 7,909,192 B2 | * | 3/2011 | Dempsey | B65D 51/1644 |
| | | | | 220/203.03 |
| 8,256,465 B2 | * | 9/2012 | Christenson | F15C 5/00 |
| | | | | 137/517 |
| 2004/0250864 A1 | * | 12/2004 | Zelson | F16K 15/144 |
| | | | | 137/859 |
| 2008/0011667 A1 | * | 1/2008 | Ruschke | F16K 15/144 |
| | | | | 210/420 |
| 2011/0108147 A1 | * | 5/2011 | Carmody | A61M 39/24 |
| | | | | 137/843 |

* cited by examiner

CHECK VALVE AND FLUID CONTAINER COMPRISING THE SAME

CROSS-REFERENCE TO RELATED APPLICATIONS

This application is a continuation-in-part of International Patent Application No. PCT/CN2012/079520 with an international filing date of Aug. 1, 2012, designating the United States, now pending, and further claims priority benefits to Chinese Patent Application No. 201110220309.8 filed Aug. 2, 2011, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 14781 Memorial Drive, Suite 1319, Houston, Tex. 77079.

BACKGROUND OF THE INVENTION

Field of the Invention

The invention relates to a valve structure, and more particularly to a check valve and a fluid container comprising the same.

Description of the Related Art

Due to the design defects of the silica gel valve plate and the valve cavity, conventional plastic check valves in the market cannot work smoothly, and air leakage or error locking frequently happens. In nonuse, these check valves are one-way or two-way closed. When used for containers filled with fluid, the plastic check valves are often out of work due to the influence of moisture.

SUMMARY OF THE INVENTION

In view of the above-described problems, it is one objective of the invention to provide a check valve and a fluid container comprising the same, both of which have a simple structure and reliable functions.

To achieve the above objective, the invention provides a check valve comprising a silica gel valve body, an upper valve cover, and a lower valve cover. The upper valve cover is provided with an air hole, and the lower valve cover is provided with an air inlet leg. The silica gel valve body comprises an outer ring and an inner ring, a sealed valve plate is arranged inside the inner ring, and the outer ring is connected to the inner ring through elastic pieces. The outer ring is fixed between the upper valve cover and the lower valve cover. The inner ring is in a suspended state between the upper valve cover and the lower valve cover. Under the action of external force, air rushes into the check valve from the air inlet leg of the lower valve cover and acts on the sealed valve plate of the inner ring of the silica gel valve body to raise the inner ring, so that an upper surface of the inner ring is closely attached to an inner surface of the upper valve cover to prevent the air from escaping from the air hole of the upper valve cover.

In another aspect, the invention provides a fluid container. The fluid container comprises the above-described check valve at the top thereof.

The check valve and the fluid container have the following advantages: the silica gel valve body comprises the outer ring and the inner ring, the sealed valve plate is arranged inside the inner ring, the inner ring is connected to the outer ring through the elastic pieces, the outer ring is fixed between the upper valve cover and the lower valve cover, and the inner ring is in a suspended state between the upper valve cover and the lower valve cover. Thus, in natural state, the air above the upper valve cover and below the lower upper valve cover communicates with each other. Under the action of external force, air rushes into the check valve from the air inlet leg of the lower valve cover and acts on the sealed valve plate of the inner ring of the silica gel valve body to raise the inner ring, so that the vapor or fluid brought by the gas can be effectively prevented from being adhered to the silica gel valve body, the interference of the inner side surface of the cavity with the normal operation of the silica gel valve body is effectively avoided, and therefore the operating efficiency of the check valve is greatly improved. The check valve of the invention can be used for the containers with different purposes such as hose containers for filling beverage, soap lye or other fluid, to control the air sealing or circulating state inside the container, and has a simple structure and reliable functions.

In the drawings, the following reference numbers are used: check valve 1, silica gel valve body 2, upper valve cover 3, lower valve cover 4, outer ring 5, inner ring 6, elastic pieces 7, supporting ring 8, air inlet leg 9, air hole 10, inner spherical surface 11, drainage cup 12, and bottle body 13.

DETAILED DESCRIPTION OF THE EMBODIMENTS

The invention is explained in further details below with reference to the accompanying drawings and embodiments.

As shown in FIGS. 1-5, a check valve 1 comprises a silica gel valve body 2, an upper valve cover 3, and a lower valve cover 4. The upper valve cover 3 is provided with an air hole 10, and the lower valve cover 4 is provided with an air inlet leg 9. The silica gel valve body comprises an outer ring 5 and an inner ring 6. A sealed valve plate is arranged inside the inner ring 6. The outer ring 5 is connected to the inner ring 6 through elastic pieces 7. The outer ring 5 is fixed between the upper valve cover 3 and the lower valve cover 4, and the inner ring 6 is in a suspended state between the upper valve cover 3 and the lower valve cover 4.

The outer ring 5 of the silica gel valve body 2 is clamped by the upper valve cover 3 and the lower valve cover 4 and thus cannot be moved.

The lower valve cover 4 is provided with a supporting ring 8, the lower surface of the outer ring 5 is supported by the supporting ring 8, and the upper surface of the outer ring 5 is pressed by the upper valve cover 3.

The outer ring 5 of the silica gel valve body 2 is supported by the supporting ring 8 of the lower valve cover 4, so that the inner ring 6 of the valve body 2 is naturally in a suspended state in a valve cage under the action of the elastic pieces 7 connecting the outer ring 5 with the inner ring 6.

Figure 1:
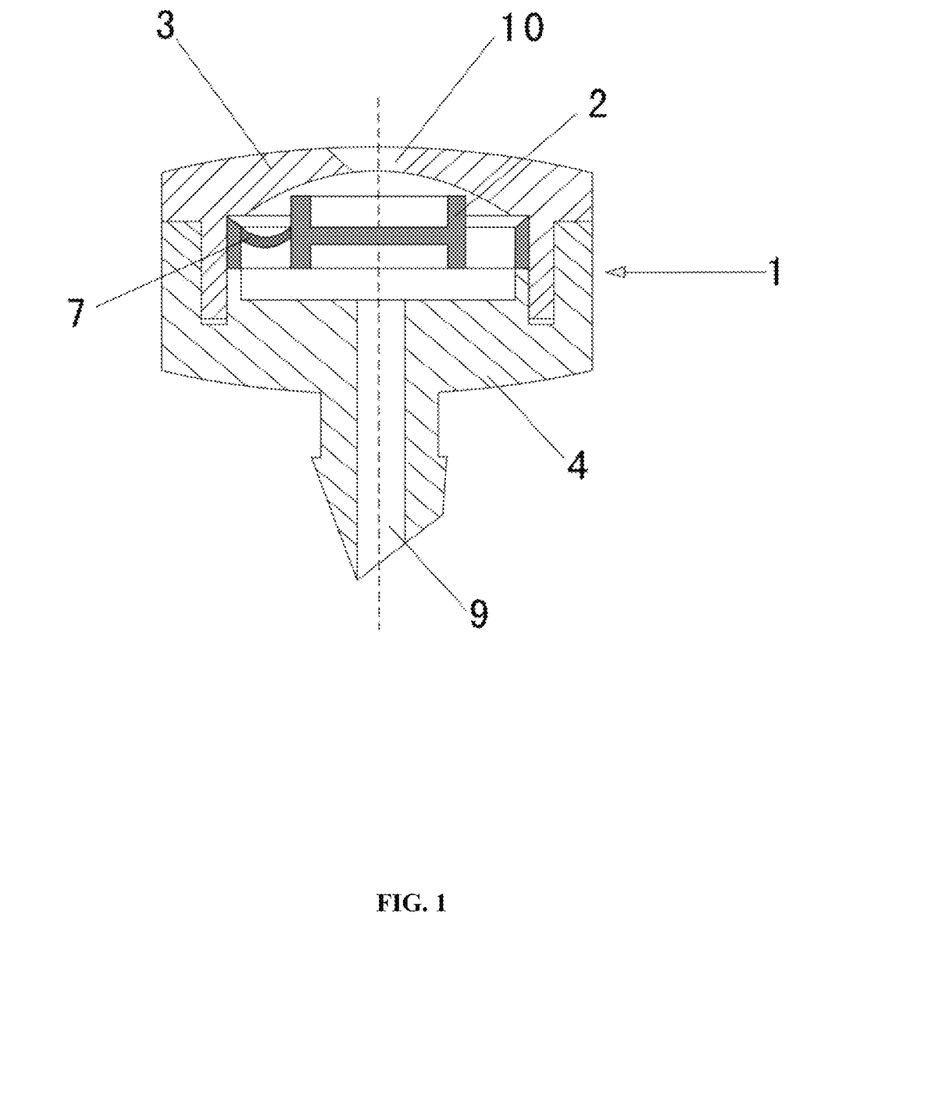
FIG. 1 is a schematic diagram of a check valve in accordance with one embodiment of the invention.
Figure 4:
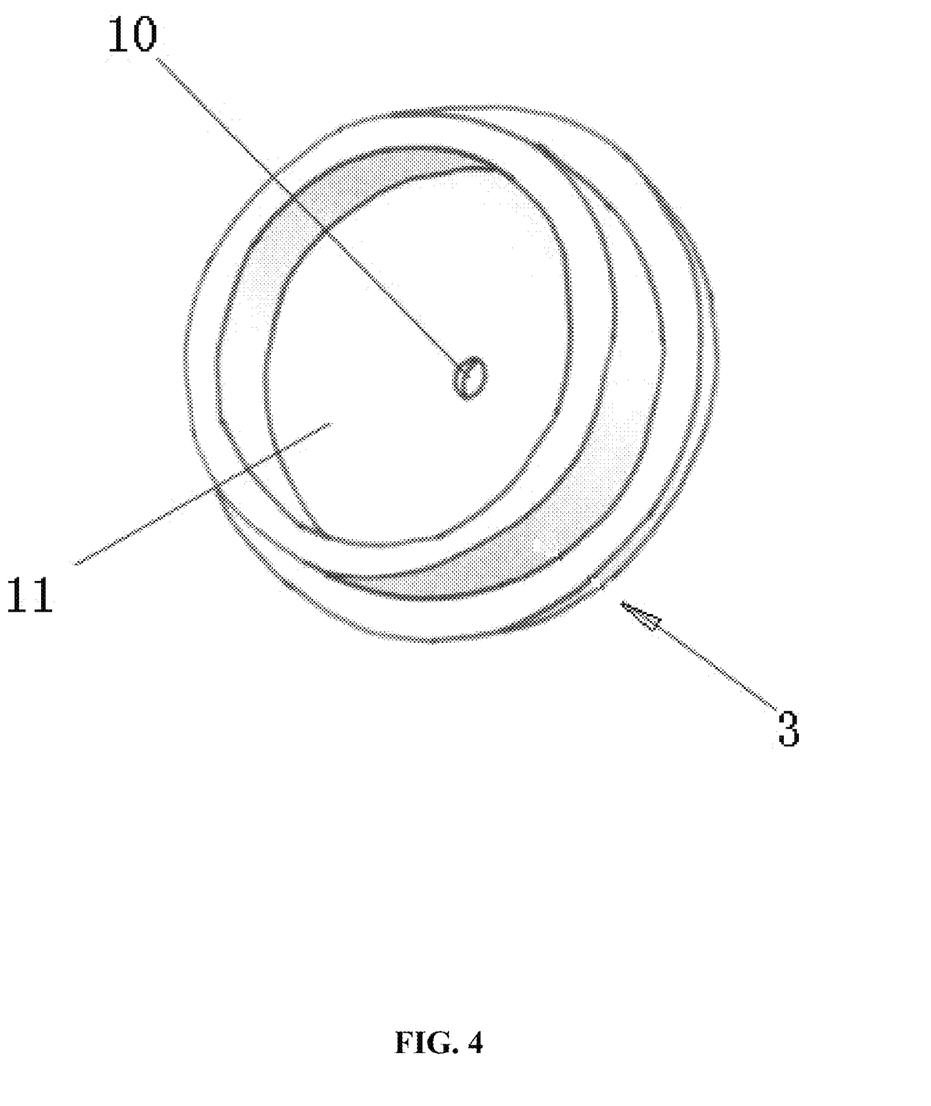
FIG. 4 is a three-dimensional view of an upper valve cover of a check valve in accordance with one embodiment of the invention.
Figure 5:
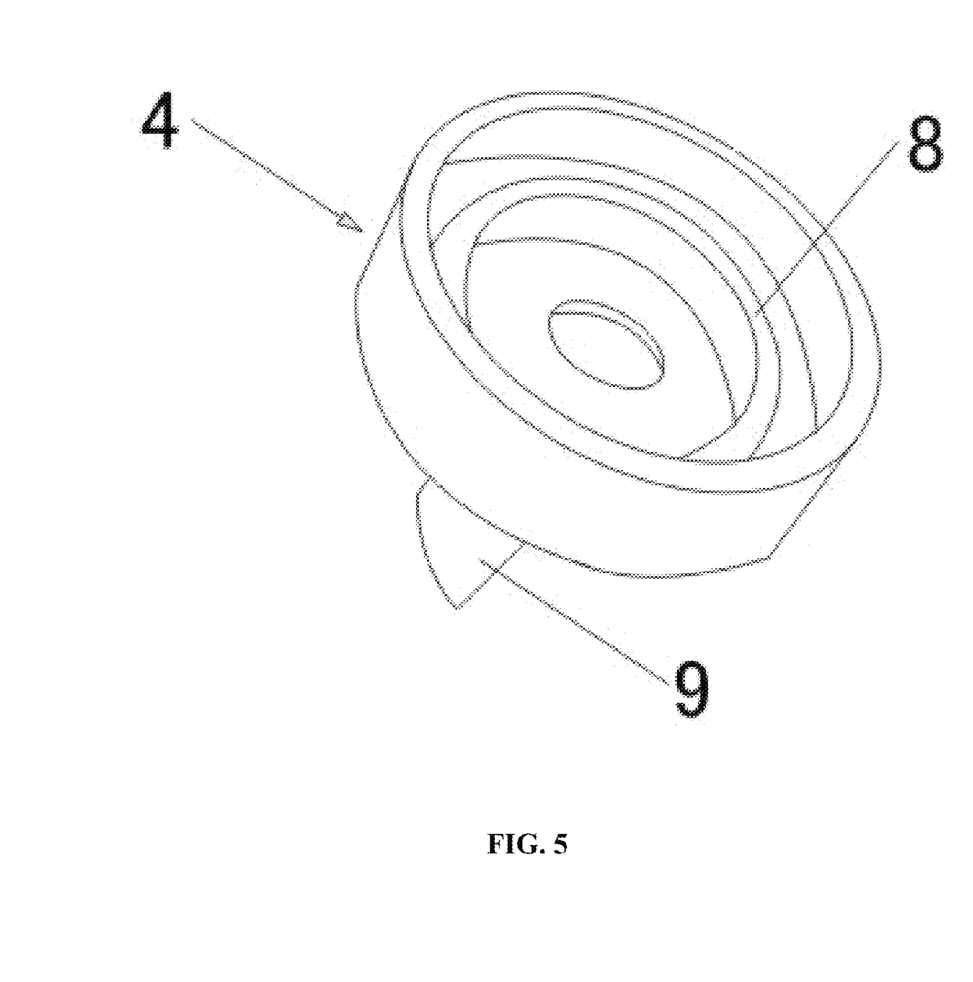
FIG. 5 is a three-dimensional view of a lower valve cover of a check valve in accordance with one embodiment of the invention.

The upper valve cover 3 and the lower valve cover 4 are fit tightly without clearance, so that the gas cannot be leaked through the contact surface between the upper valve cover 3 and the lower valve cover 4, and an anti-shedding buckle (not shown in the Figures) is arranged between the valve cover 3 and the lower valve cover 4 to prevent disengagement.

Figure 2:
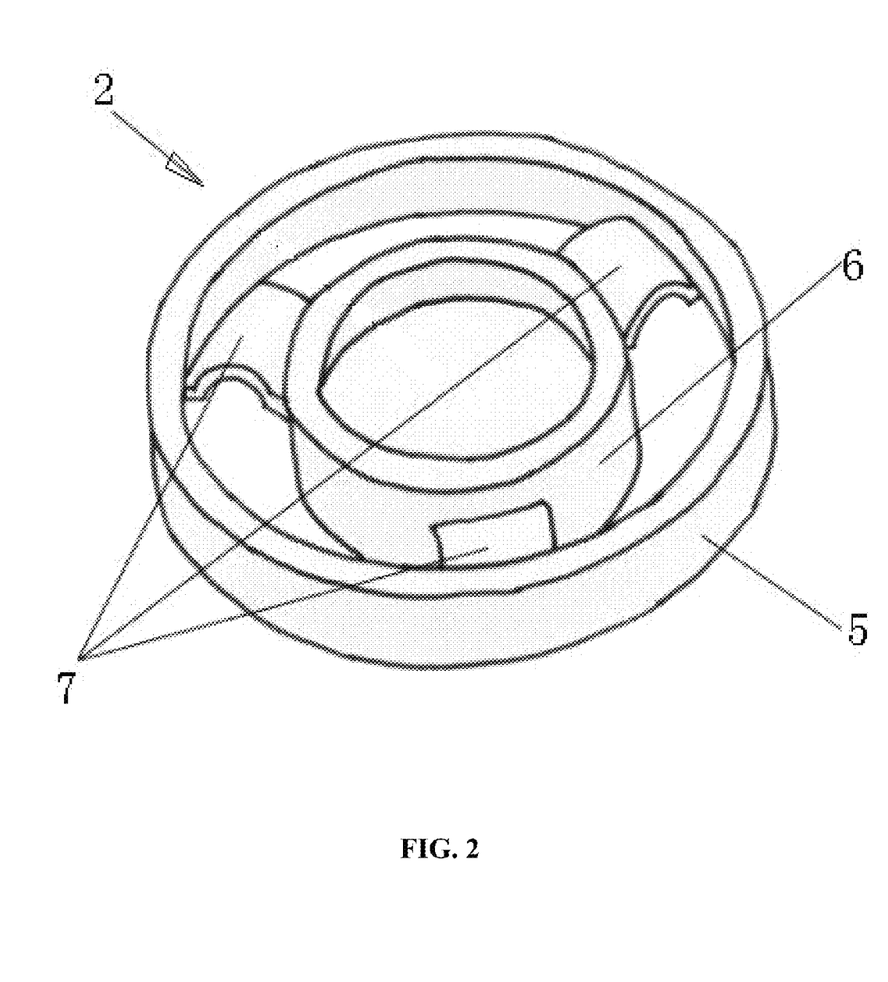
FIG. 2 is a three-dimensional view of a silica gel valve of a check valve in accordance with one embodiment of the invention.
Figure 3:
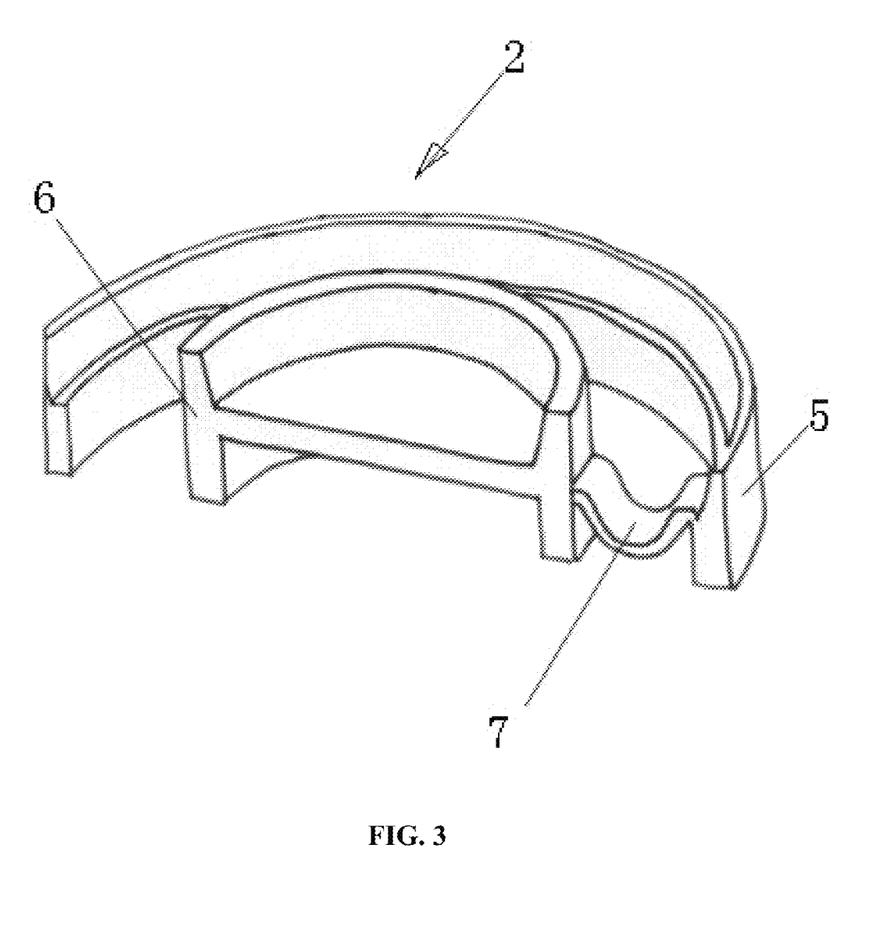
FIG. 3 is a three-dimensional sectional view of a silica gel valve of a check valve in accordance with one embodiment of the invention.

As shown in FIG. 2 and FIG. 3, three elastic pieces 7 are evenly distributed in the silica gel valve body 2 to connect the outer ring 5 with the inner ring 6 in the valve body. The inner ring 6 is positioned in the middle of the cavity and is not in contact with the inner side surface of the cavity, only capable of moving in parallel up and down and free of interference by the friction of the inner side wall of the cavity, so that the air can be locked effectively. It should be noted that the number of the elastic pieces 7 is not limited to three, which may be plural in number, for example, two or more, and distributed evenly.

The inner surface of the upper valve cover is an inner spherical surface 11. In natural state, neither the upper valve cover 3 nor the lower valve cover 4 contacts with the inner ring 6. That is to say, the air above the upper valve cover 3 and below the lower upper valve cover 4 communicates with each other. Under the action of external force, air rushes into the valve cage from the air inlet leg 9 of the lower valve cover 4, all gas almost acts on the sealed valve plate of the inner ring 6 of the valve body to rapidly raise the inner ring 6, so that the upper surface of the inner ring 6 is closely attached to the inner spherical surface 11 of the upper valve cover 3 to prevent the air from escaping from the air hole 10 of the upper valve cover. After the air thrusting up from the air inlet leg 9 is discharged, the three elastic pieces 7 in the valve body pull the inner ring 6 and the sealed valve plate downward to the original position to return a suspended state. Because the inner ring 6 of the valve body is suspended in the valve cage and cannot be in contact with the upper cover and the lower cover, the vapor or fluid brought by the gas can be effectively prevented from being adhered to the lower cover surface and the upper cover surface of the silica gel valve body, so that the phenomena of air leakage and erroneous air locking can be avoided to keep the normal function of the check valve.

Figure 6:
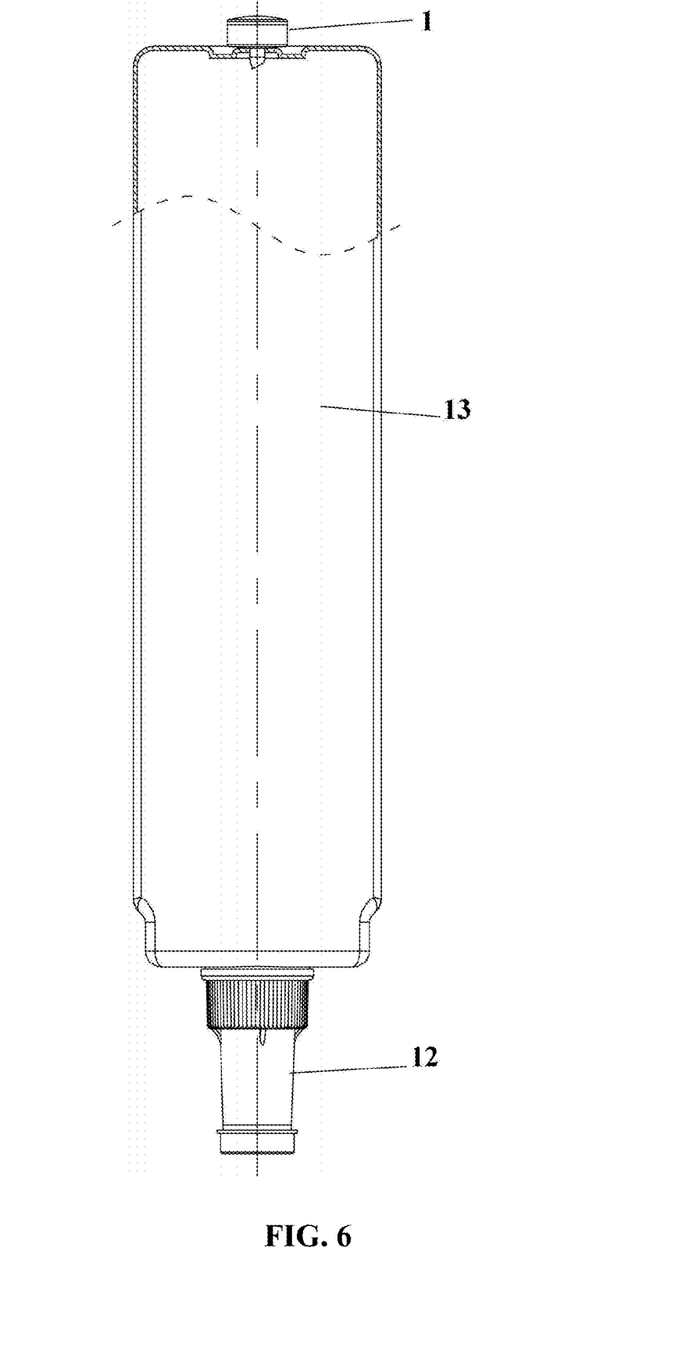
FIG. 6 is a schematic diagram of a fluid container in accordance with one embodiment of the invention.

As shown in FIG. 6, a fluid container incapable of being filled repeatedly comprises a drainage cup 12, a bottle body 13, and a check valve 1. The check valve 1 is inserted on the top of the bottle body 13. The drainage cup 12 is arranged at a lower opening of the bottle body 13. A water outlet valve (not shown in the Figures) is installed in the drainage cup 12 (or at the lower opening of the bottle body 13). The water outlet valve has the function of stopping flow, and only when the bottle body 13 is pressed can the fluid flow out.

The fluid cannot flow out in the natural state because the water outlet valve (not shown in the Figures) arranged at the lower opening of the bottle body 13 stops the flow. When the bottle body 13 filled with the fluid is pressed, the gas in the bottle is obstructed not to escape upward due to the function of the check valve 1 so as to act on the fluid, and the fluid flows downward through the drainage cup 12. When the extrusion pressure exerted on the bottle body 13 is withdrawn, the water outlet valve is recovered to the natural state, and the fluid cannot flow out any more; meanwhile, the gas enters the bottle through the check valve 1, and the bottle body 13 is recovered to the original state.

Preferably, the fluid container is a beverage bottle, a soap lye bottle, or a wine bottle.

Preferably, the bottle body of the fluid container is made of flexible material.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A check valve, comprising:
a) a silica gel valve body, the silica gel valve body comprising a valve plate, an outer ring, a plurality of elastic pieces, and an inner ring, the inner ring comprising an inner wall;
b) an upper valve cover, the upper valve cover comprising an inner spherical surface and an air hole; and
c) a lower valve cover, the lower valve cover comprising an air inlet leg; wherein:
the valve plate is arranged inside the inner ring;
the outer ring is fixed between the upper valve cover and the lower valve cover;
the valve plate contacts the inner wall and subdivides the inner wall into a first part and a second part;
the inner ring is connected to the outer ring via the plurality of elastic pieces and is in a suspended state between the upper valve cover and the lower valve cover; the inner ring is moveable between the upper valve cover and the lower valve cover; and in the suspended state the inner ring does not contact the upper valve cover or the lower valve cover.

2. The check valve of claim 1, wherein the lower valve cover is provided with a supporting ring, a lower surface of the outer ring is supported by the supporting ring, and an upper surface of the outer ring is pressed by the upper valve cover.

3. The check valve of claim 2, wherein the plurality of elastic pieces is plural in number and is evenly distributed circumferentially.

4. The check valve of claim 3, wherein the plurality of elastic pieces is three in number.

5. The check valve of claim 1, wherein the upper valve cover and the lower valve cover are fit tightly.

6. The check valve of claim 1, wherein when in use, air flows into the check valve from the air inlet leg and exerts a pressure on the valve plate, the inner ring then moves with the valve plate toward the upper valve cover under the pressure until an upper surface of the inner ring comes into close contact with the inner spherical surface, and the inner ring and the valve plate then seal the air hole to prevent the air from escaping through the air hole.

7. A fluid container, comprising the check valve of claim 1, wherein the check valve is disposed on the top of the fluid container.

8. The fluid container of claim 7, wherein the fluid container further comprises a drainage cup and a bottle body; the check valve is inserted on a top of the bottle body, and the drainage cup is arranged at a lower opening of the bottle body.

9. The fluid container of claim 7, wherein the fluid container is a beverage bottle, a soap lye bottle, or a wine bottle.

10. The fluid container of claim 7, wherein the bottle body of the fluid container is made of flexible material.

\* \* \* \* \*